(12) United States Patent
Jones et al.

(10) Patent No.: US 10,471,862 B2
(45) Date of Patent: Nov. 12, 2019

(54) VEHICLE SEAT WITH RESILIENT INSERT

(71) Applicant: Lear Corporation, Southfield, MI (US)

(72) Inventors: Paul Jones, West Midlands (GB); Clark Pitcher, Warwickshire (GB)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/832,323

(22) Filed: Dec. 5, 2017

(65) Prior Publication Data

US 2019/0168645 A1 Jun. 6, 2019

(51) Int. Cl.
| | |
|---|---|
| *B60N 2/42* | (2006.01) |
| *B60R 21/055* | (2006.01) |
| *B60N 2/70* | (2006.01) |
| *B60N 2/68* | (2006.01) |
| *B60N 2/60* | (2006.01) |

(52) U.S. Cl.
CPC ......... *B60N 2/4249* (2013.01); *B60N 2/4221* (2013.01); *B60N 2/6009* (2013.01); *B60N 2/68* (2013.01); *B60N 2/70* (2013.01); *B60R 21/055* (2013.01); *B60N 2/4214* (2013.01)

(58) Field of Classification Search
CPC .......... B60N 2/4249; B60N 2/68; B60N 2/70; B60N 2/4214; B60R 21/055
See application file for complete search history.

(56) References Cited

U.S. PATENT DOCUMENTS

| | | | |
|---|---|---|---|
| 5,786,394 A | 7/1998 | Slaven | |
| 7,222,915 B2 * | 5/2007 | Philippot | B60N 2/70 297/216.13 |
| 7,419,209 B1 | 9/2008 | Mangiapane et al. | |
| 8,322,790 B2 | 12/2012 | Tscherbner | |
| 8,439,440 B2 * | 5/2013 | Ellison | B29C 44/0461 297/216.1 |
| 8,801,094 B2 * | 8/2014 | Nishiura | B60N 2/7011 297/218.1 |
| 8,857,908 B2 * | 10/2014 | Brncick | B60N 2/0232 297/284.1 |
| 2004/0115420 A1 | 6/2004 | Schoemann | |
| 2005/0140199 A1 * | 6/2005 | Kang | B60N 2/4263 297/452.27 |
| 2007/0176480 A1 | 8/2007 | Brunner | |
| 2010/0078983 A1 | 4/2010 | Yetukuri et al. | |
| 2011/0221254 A1 | 9/2011 | Lindsay et al. | |
| 2015/0360592 A1 | 12/2015 | Wroblewski et al. | |

FOREIGN PATENT DOCUMENTS

| | | |
|---|---|---|
| DE | 102013200076 A1 | 7/2014 |
| WO | 03037667 A1 | 5/2003 |

* cited by examiner

*Primary Examiner* — Philip F Gabler
(74) *Attorney, Agent, or Firm* — MacMillan, Sobanksi & Todd, LLC

(57) ABSTRACT

A back portion of a seat includes a frame and an occupant support that is supported on the frame. The occupant support defines an A-surface and a B-surface located on an opposed side of the frame from the A-surface. An insert is located in the occupant support between the frame and the B-surface. The insert includes a frame cradle, and the frame has an upper end that is located in the frame cradle.

12 Claims, 4 Drawing Sheets

VEHICLE SEAT WITH RESILIENT INSERT

BACKGROUND OF THE INVENTION

This invention relates in general to vehicle seats. In particular, this invention relates to an improved structure for a vehicle seat including a seat back having an energy absorbing safety feature.

Vehicles, such as passenger cars, include seats for the driver and occupants. A typical vehicle seat includes a seat portion and a back portion that supports the back of the occupant. The back portion usually includes a structural frame having occupant support and cushioning features supported thereon. The structural frame is typically made from a relatively rigid material, such as steel or aluminum. The occupant support and cushioning features typically include springs, foam, and a trim or upholstery layer. These features help prevent the occupant from contacting the seat frame and make the seat more comfortable for the occupant.

The back portion also typically includes cushioning or padding on a rear side and an upper side of the seat frame. This cushioning or padding is provided to help protect an occupant of a rear seat in the vehicle. In the event of a sudden stop, the rear seat occupant may be thrown forward against the back portion. The cushioning or padding helps prevent the occupant from striking the rigid structural frame of the back portion. It would be desirable to have an alternative structure to provide cushioning or padding on the seat back portion, while also being able to maintain a desired appearance thereof.

SUMMARY OF THE INVENTION

The invention relates to a back portion of a seat that includes a frame and an occupant support that is supported on the frame. The occupant support defines an A-surface and a B-surface located on an opposed side of the frame from the A-surface. An insert is located in the occupant support between the frame and the B-surface. The insert includes a frame cradle, and the frame has an upper end that is located in the frame cradle.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
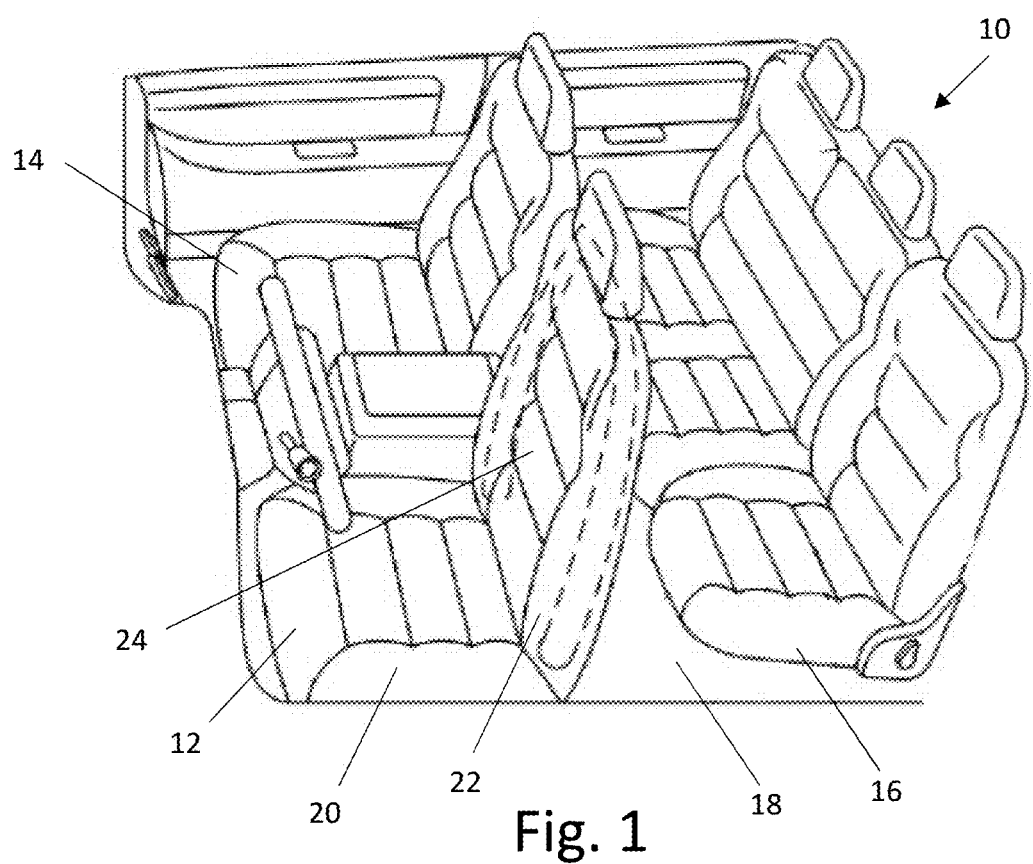
FIG. 1 is a perspective view of an interior passenger compartment of a vehicle including two front seats and a rear seating area.

Referring now to the drawings, there is illustrated in FIG. 1 a vehicle interior, indicated generally at 10. The vehicle interior 10 includes a driver seat 12, a front passenger seat 14, and a rear seating area 16. The seats 12 and 14 are secured to a vehicle floor 18. The driver seat 12 includes a seat portion 20 and a back portion 22. For the purposes described herein, only the driver seat 12 will be described in detail. However, the features described herein may be included in any desired vehicle seat or any other desired seat.

Figure 2:
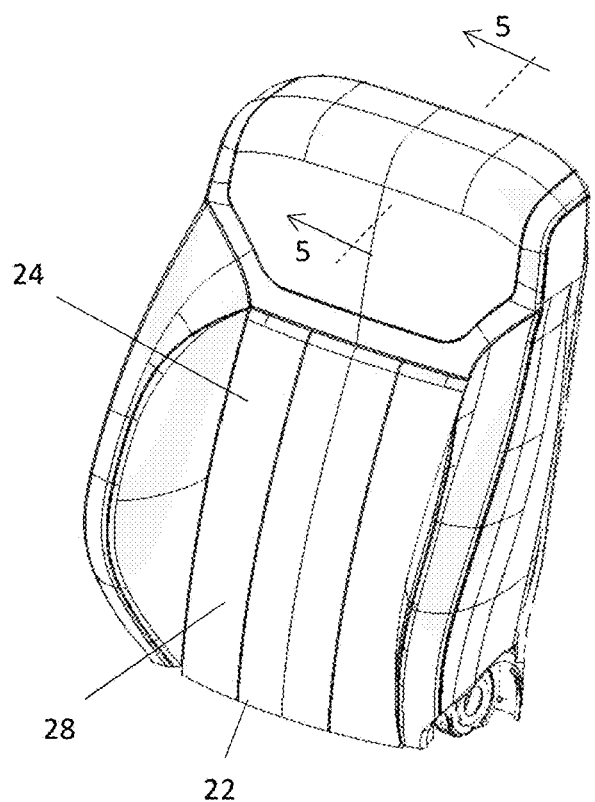
FIG. 2 is a front perspective view of a back portion of one of the front seats shown in FIG. 1.
Figure 3:
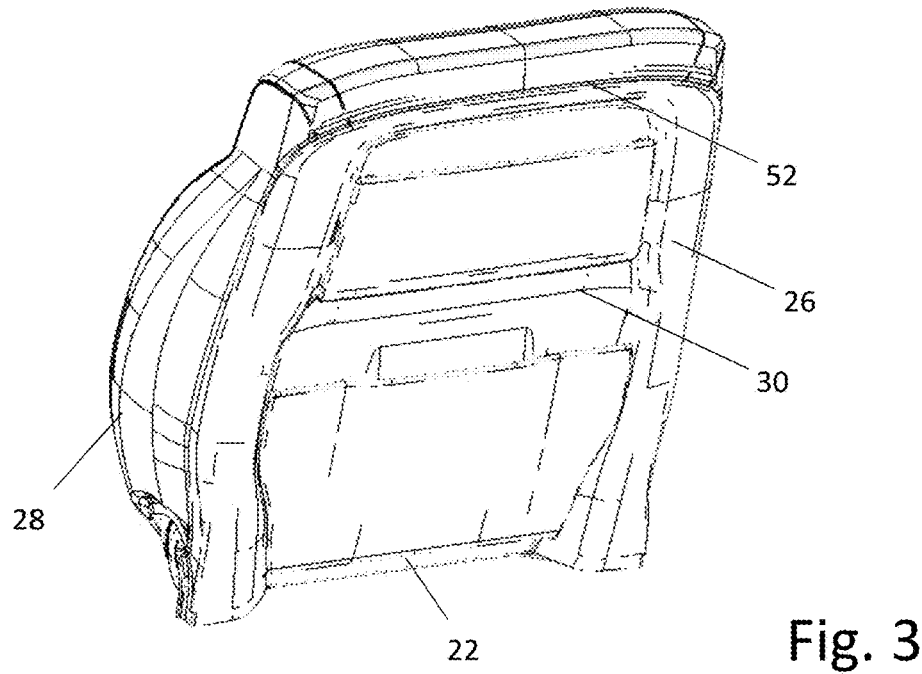
FIG. 3 is a rear perspective view of the back portion of the seat illustrated in FIGS. 1 and 2.

Referring now to FIG. 2, there is shown a perspective view, from the front, of the back portion 22 of the driver seat 12, while FIG. 3 shows a perspective view, from the back, of the back portion 22 of the driver seat 12. The back portion 22 has an A-surface 24, which is the surface of the back portion 22 that normally faces an occupant of the driver seat 12, and a B-surface 26, which is the opposed surface of the back portion 22 that normally faces an occupant of the rear seat 16. The back portion 22 includes a trim layer 28 that covers the A-surface 24 and provides a contact surface and wear protection for the back portion 22. The illustrated trim layer 28 is made of leather, but may be made of any desired material. The back portion 22 also includes a back panel 30 that is located on the B-surface 26. The illustrated back panel 30 is made of plastic, but may be made of any desired material. The back panel 30 provides a decorative and protective cover for the back portion 22.

Figure 4:
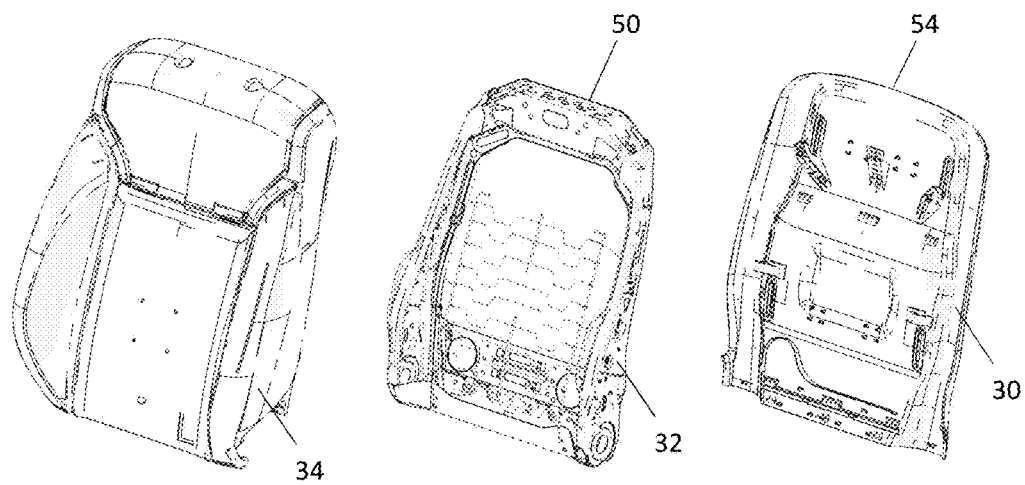
FIG. 4 is an exploded front perspective view of the back portion of the seat illustrated in FIGS. 1, 2, and 3.

Referring to FIG. 4, there is illustrated a perspective, partially-exploded view of the back portion 22, with the trim layer 28 not shown. The back portion 22 includes a frame 32 that provides structural support to the back portion 22. The illustrated frame 32 is made of steel, but may be made of any desired material. The back portion 22 includes an occupant support 34 that is supported on the frame 32. The occupant support 34 provides cushioning between the occupant of the driver seat 12 and the frame 32. The illustrate occupant support 34 is made of polyurethane foam, but may be made of any desired material. The previously-described back panel 30 is also supported on the frame 32.

Figure 5:
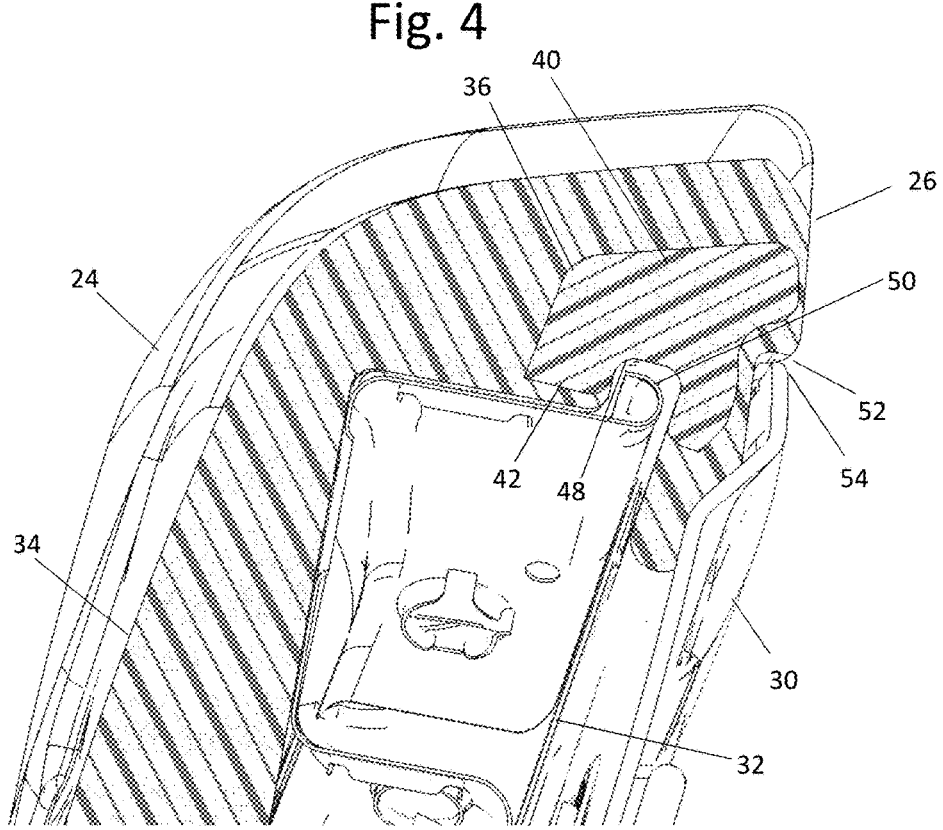
FIG. 5 is an enlarged cross-sectional view of an upper portion of the back portion of the seat taken along the line 5-5 of FIG. 2.

Referring to FIG. 5, a cross-sectional view of the back portion 22, taken along the line 5-5 of FIG. 2, is illustrated. The back portion 22 includes an insert 36 located within the occupant support 34. The illustrated insert 36 is made from injection molded expanded polypropylene, but may be made of any desired material and by any desired process. The illustrated insert 36 is made of a softer material than the occupant support 34, but the materials may have any desired relative stiffness. In the illustrated embodiment, the occupant support 34 is overmolded around the insert 36 such that the insert 36 is embedded within the occupant support 34. However, the insert 36 may be connected to the occupant support 34 by any desired method.

Figure 6:
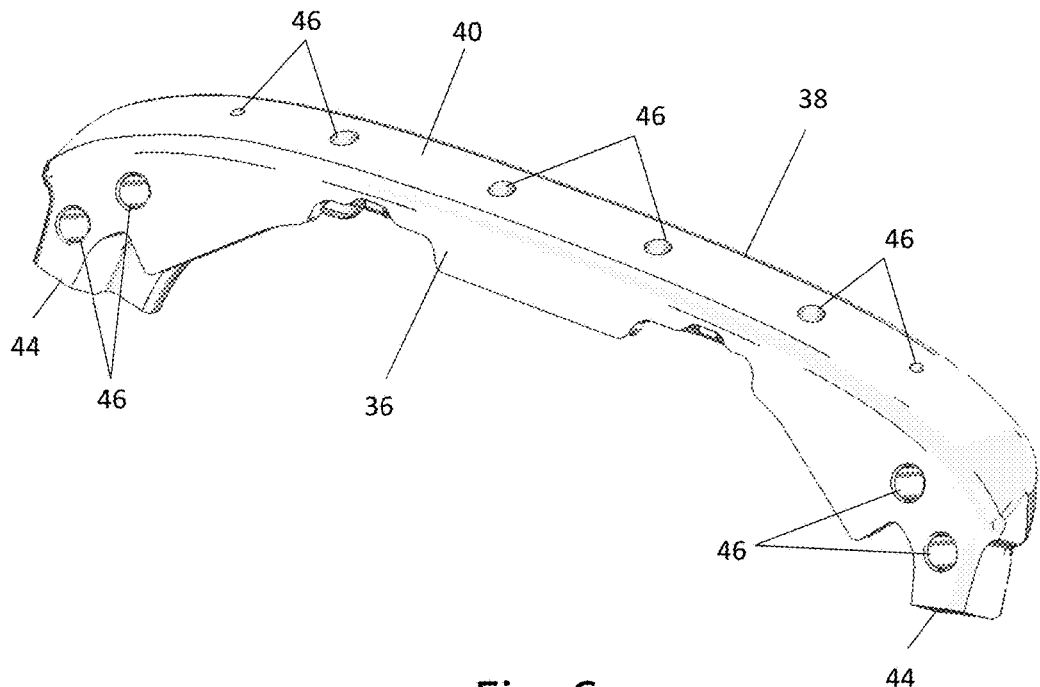
FIG. 6 is a front perspective view of a resilient insert provided in the upper portion of the back portion of the seat illustrated in FIGS. 1 through 5.
Figure 7:
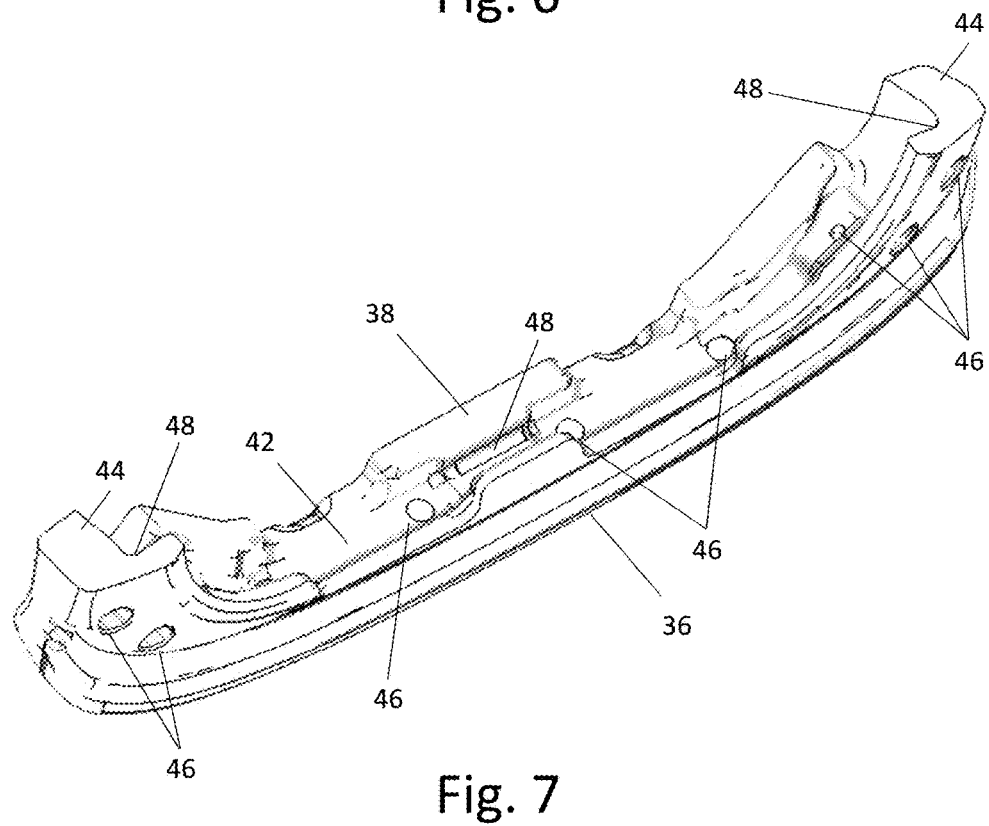
FIG. 7 is a bottom perspective view of the resilient insert illustrated in FIG. 6.

Referring to FIGS. 6 and 7, perspective views of the insert 36 are illustrated. The insert 36 includes an insert body 38 that has a first surface 40 and an opposed second surface 42. When installed in the driver seat 12, the first surface 40 is an upper surface, and the second surface 42 is a lower surface. The insert 36 includes two wings 44 that extend from the insert body 38 in the direction of the second surface 42. The two wings 44 are located on opposed ends of the insert body 38.

The insert 36 also includes a plurality of through holes 46 defined through the insert body 38 and the wings 44. The illustrated through holes 46 pass completely through the insert 36. The illustrated insert 36 includes ten of such through holes 46, but may include any desired number in any desired locations. The through holes 46 are provided so that when the foam occupant support 34 is overmolded around the insert 36, the material of the foam occupant support 34 is able to pass into the through holes 46 in order to hold the insert 36 in position relative to the support 36.

The insert 36 further includes a generally U-shaped frame cradle 48. The frame cradle 48 is located on the second surface 42 of the insert body 38 and the wings 44. As shown in FIG. 5, when the back portion 22 is assembled, an upper end 50 of the frame 32 is located in the frame cradle 48. This helps to properly position the occupant support 34 relative to the frame 32. Additionally, a portion of the insert 36 is located between the upper end 50 of the frame 32 of the B-surface 26 of the back portion 22. As a result, if the occupant of the rear seat 16 were to be thrown forward into the back portion 22, the insert 36 would be located between the occupant and the upper end 50 of the frame 32 and, thus, would help dissipate the energy of the impact.

The occupant support 34 includes a panel lip 52 that is located on the B-surface of the back portion 22. The panel lip 52 is a portion of the occupant support 32 that extends farther from the frame 32. A panel edge 54 of the back panel 30 is located adjacent to the panel lip 52. When the back portion 22 is assembled, the back panel 30 is attached to the frame 32, and a portion of the occupant support 34 is compressed between the back panel 30 and the frame 32. A portion of the insert 36 is located between the back panel 30 and the frame 32. As previously described, the insert 36 is softer than the foam that the occupant support 34 is made from. As a result, when the occupant support 34 is compressed between the back panel 30 and the frame 32, the insert 36 is compressed more than the occupant support 34. Consequently, the occupant support 34 is able to maintain its shape and appearance while sitting adjacent to the back panel 30. This provides an improved appearance to the B-surface of the back portion 22.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A back portion of a seat comprising:
a rigid frame having an upper end;
an occupant support that is supported on the frame, the occupant support defining an A-surface that is located on a first side of the frame and a B-surface that is located on a second side of the frame opposite to the first side of the frame; and
an insert that is embedded within the occupant support between the frame and the B-surface, the insert including a frame cradle, wherein the upper end of the frame is located in the frame cradle,
wherein the insert has at least one aperture extending therethrough, and wherein a portion of the occupant support extends through the aperture extending through the insert.

2. The back portion of a seat of claim 1, further including a back panel that is attached to the frame and extends over the B-surface of the occupant support.

3. The back portion of a seat of claim 2, wherein the occupant support includes a panel lip that extends over an edge of the back panel.

4. The back portion of a seat of claim 3, wherein a portion of the insert is located between the panel lip and the frame.

5. A back portion of a seat comprising:
a rigid frame having an upper end; and
an occupant support formed from a cushioning material, the occupant support having an insert embedded therein that is formed from a material that is softer than the cushioning material, the insert having a frame cradle provided therein that receives the upper end of the rigid frame so as to support and position the occupant support on the rigid frame,
wherein the insert has at least one aperture extending therethrough, and wherein a portion of the occupant support extends through the aperture extending through the insert.

6. The back portion of a seat of claim 5, further including a back panel that is attached to the frame and extends over the B-surface of the occupant support.

7. The back portion of a seat of claim 6, wherein the occupant support includes a panel lip that extends over an edge of the back panel.

8. The back portion of a seat of claim 7, wherein a portion of the insert is located between the panel lip and the frame.

9. A back portion of a seat comprising:
an occupant support formed from a cushioning material;
an insert embedded within the occupant support and formed from a material that is softer than the cushioning material, the insert having a frame cradle provided therein; and
a rigid frame having an upper end that is received within the frame cradle so as to support and position the insert and the occupant support thereon,
wherein the insert has at least one aperture extending therethrough, and wherein a portion of the occupant support extends through the aperture extending through the insert.

10. The back portion of a seat of claim 9, further including a back panel that is attached to the frame and extends over the B-surface of the occupant support.

11. The back portion of a seat of claim 10, wherein the occupant support includes a panel lip that extends over an edge of the back panel.

12. The back portion of a seat of claim 11, wherein a portion of the insert is located between the panel lip and the frame.

* * * * *